US012675122B2

(12) United States Patent
Nardi

(10) Patent No.: US 12,675,122 B2
(45) Date of Patent: Jul. 7, 2026

(54) GAS REGULATOR

(71) Applicant: PIETRO FIORENTINI S.p.A.,
Arcugnano (IT)

(72) Inventor: Mario Pietro Nardi, Arcugnano (IT)

(73) Assignee: PIETRO FIORENTINI S.p.A.,
Arcugnano (IT)

( * ) Notice: Subject to any disclaimer, the term of this
patent is extended or adjusted under 35
U.S.C. 154(b) by 0 days.

(21) Appl. No.: 18/969,325

(22) Filed: Dec. 5, 2024

(65) Prior Publication Data

US 2025/0199551 A1      Jun. 19, 2025

(30) Foreign Application Priority Data

Dec. 19, 2023      (IT) ......................... 102023000027174

(51) Int. Cl.
*G05D 16/06*          (2006.01)
(52) U.S. Cl.
CPC ............................... *G05D 16/0683* (2013.01)
(58) Field of Classification Search
CPC ............ G05D 16/0683; G05D 16/0402; Y10T
137/7795; Y10T 137/783
See application file for complete search history.

(56) References Cited

U.S. PATENT DOCUMENTS 1,731,519 A * 10/1929 Bastian .............. G05D 16/0402
137/881
1,883,690 A * 10/1932 Gilgenberg ........ G05D 16/0402
137/550

2,057,133 A * 10/1936 Bryce ................ G05D 16/0402
137/71
5,427,143 A    6/1995 Maracchi
5,755,254 A * 5/1998 Carter ................ G05D 16/0655
137/340
2008/0257421 A1* 10/2008 Kranz ................ G05D 16/0683
137/557
2017/0023184 A1* 1/2017 Borghesani ........ G05D 16/0404

FOREIGN PATENT DOCUMENTS

| DE | 491865 C | * | 2/1930 |
| EP | 0778965 B1 | | 8/1999 |
| WO | 9607129 A1 | | 3/1996 |

OTHER PUBLICATIONS

Machine Translation of DE491865 retrieved from espacenet.com
(Year: 2026).*
Search report from priority application No. IT 102023000027174,
dated Apr. 23, 2024.

* cited by examiner

*Primary Examiner* — Jessica Cahill
(74) *Attorney, Agent, or Firm* — Carmel Patent Agency;
Robert Ballarini

(57) ABSTRACT

Regulator for a gas control apparatus, particularly suitable
for installation in a gas transport and/or distribution net-
work, including a containment body with a gas inlet and a
gas outlet. Inside the containment body, the regulator
includes at least one regulation stage configured to cause a
reduction of the pressure of the gas which, passing through
the regulator, goes from the inlet to the outlet. The regulator
also includes a safety block having a passage opening
between an upstream zone and a downstream zone, a shutter
for the complete closure of a further passage opening, and a
control head having a group for the controlled movement of
the shutter.

19 Claims, 8 Drawing Sheets

GAS REGULATOR

CROSS-REFERENCE TO RELATED APPLICATIONS

This application claims priority of Italian Patent Application number IT102023000027174, filed Dec. 19, 2023, the contents of which are incorporated by reference herein as if fully set forth.

TECHNICAL FIELD

The present invention concerns a regulator to be used in an apparatus for controlling gas pressure, and in particular of the type suitable for use and installation in plants and/or networks for the transport and/or distribution of gas, such as natural gas and/or also gases produced in a decentralized manner, such as biomethane and/or hydrogen.

BACKGROUND

As is known, gas transport and/or distribution networks include pressure control stations to reduce the gas pressure from the supply value to the value required by the user, and also keep it stable at the preset value, even in the event of variations in the upstream pressure or in the event of variations in the flow rate required by the user.

In particular, the aforementioned pressure reduction is obtained by means of pressure regulators which are configured to maintain the outlet pressure equal to a preset calibration value, regardless of the gas flow rate delivered.

A known type of pressure regulator comprises a gas passage duct, having an upstream end communicating with the high-pressure branch of the transport and/or distribution network, and the opposite downstream end communicating with the low-pressure branch, which is directed towards the user.

In the gas passage duct, there is a shutter that determines a constriction in the passage section of the duct itself, thus causing a reduction in gas pressure between upstream and downstream of the shutter itself. In particular, the pressure reduction occurs by lamination of the gas at the passage section on which the shutter acts.

Conveniently, the shutter is movable so that the passage section, and therefore the gas pressure drop, can be modified as a function of the gas flow rate itself.

The movement of the shutter is controlled by a feedback system which—in the presence of an increase, with respect to the calibration value, of the pressure of the gas supplied downstream (i.e. of the gas downstream of the regulator)—reduces the level of opening of the shutter itself; the opposite occurs in the case of a reduction in pressure.

Depending on the type of control provided, direct-operated pressure control devices and pilot-operated pressure control devices/apparatus are provided. In particular, in direct-operated control devices a single regulator is provided whose level of opening of the shutter—and in particular the level of opening of the section for the passage of gas—is generated by the comparison between the pressure detected downstream (connected to the control head) which pushes on the movable wall (membrane) of the motorization chamber, and the thrust generated by the calibration spring. In pilot-operated control devices, however, a main regulator and an further regulator, called pilot regulator, are provided; in particular, in these devices, the level of opening of the shutter of the main regulator—and in particular of its section for the passage of gas—is controlled/commanded by the pilot regulator which, depending on the compression value of its calibration spring and the actual pressure detected downstream of the device, supplies the main regulator with a command pressure (motorization) adequate to bring the device into equilibrium.

Direct-operated control devices are simpler to construct (in particular, they have fewer components and fewer connections), however, the level of control precision/accuracy is lower than that of pilot-operated control devices. On the other hand, direct-operated control devices have a much higher response speed to downstream load changes. For this reason, their applications are different: direct-operated control devices are mainly used for medium and low-pressure networks (such as civil and industrial distribution networks), with relatively low flow rates and more frequent load variations; pilot-operated control devices are instead mostly used for medium and high-pressure networks, where higher flow rates are required and where the variations in the required flow rate are lower and less frequent (such as transport networks).

Traditional type control devices, in addition to one or more regulation stages of the gas pressure passing through them, can be equipped with an integrated safety block which, when activated, prevents the gas from reaching the regulator outlet which is fluidically connected to a section of the downstream circuit duct. However, in the event of a failure or anomaly of the safety block (for example in the event of a breakage of the membrane of said block), the gas is discharged into the atmosphere in an uncontrolled manner. Therefore, currently, in order to install traditional type control devices in a closed environment (indoor), or near sources of ignition, it is necessary—for safety reasons—to set up a system for conveying the gas towards the outside of the closed environment or in any case far from the source of ignition, or in any case it is necessary to install externally on the regulator, in particular in fluidic connection with the discharge of the regulator into the atmosphere, a dedicated device for calibrating the gas flow rate (for example the so-called "vent limiter"). In any case, however, in traditional control devices, the rupture of the safety block membrane causes a particularly anomalous functioning of the safety block itself, if not even causes its function of interrupting the flow of gas towards the outlet of the device which is fluidically connected to the duct or the downstream users to fail.

OBJECTS OF THE INVENTION

The object of the invention is to propose a gas regulator, in particular a regulator of the type to be installed in an apparatus for controlling gas pressure in a gas transport and/or distribution network, which allows the drawbacks of known solutions, in whole or in part, to be overcome.

Another object of the invention is to propose a regulator that can be installed in a closed environment (indoor), or near an ignition source, and this without having to set up a system for conveying the gas towards the outside of the closed environment or in any case far from the ignition source, and also without having to install externally on the regulator a further and dedicated device (such as for example a gas flow rate calibration device) to control the gas discharge towards the outside of the regulator itself.

Another object of the invention is to propose a regulator which, in the event of overpressure downstream of the regulator, completely interrupts the gas supply.

Another object of the invention is to propose a regulator which, in the event of overpressure downstream of the same, discharges the gas into the atmosphere in a controlled manner.

Another object of the invention is to propose a regulator with a safety block which, in the event of overpressure downstream of the same, completely interrupts the gas supply and which, in the event of an anomaly in the safety block, discharges the gas into the atmosphere (thus allowing the smell of gas to be perceived or detected in the environment and therefore the anomaly to be noticed) and, at the same time, ensures the interruption of the gas flow towards the regulator outlet which is fluidically and mechanically connected to a section of duct downstream of the regulator itself.

Another object of the invention is to propose a regulator with a safety block which, in the event of overpressure downstream of the same, completely interrupts the gas supply and which, in the event of an anomaly of the safety block, discharges the gas into the atmosphere in a controlled manner.

Another object of the invention is to propose a regulator with a safety block which, in the event of overpressure downstream of the same, completely interrupts the gas supply and which, in the event of failure or anomaly of the safety block, reduces the discharge of gas into the atmosphere.

Another object of the invention is to propose a regulator that is particularly durable, robust and less subject to wear.

Another object of the invention is to propose a regulator that has a small size, thus facilitating its installation.

Another object of the invention is to propose a regulator that is easy and quick to maintain, as well as inexpensive.

Another object of the invention is to propose a regulator that can be obtained in a simple, rapid and low-cost way.

Another object of the invention is to propose a regulator that is in line with the regulations in force in the sector.

Another object of the invention is to propose a regulator that is smaller in size, and therefore more compact, than known solutions.

Another object of the invention is to propose a regulator that allows precise control with precise regulation of the pressure of the gas passing through it.

Another object of the invention is to propose a regulator that is highly safe and reliable.

Another object of the invention is to propose a regulator that is an improvement and/or alternative to traditional ones.

Another object of the invention is to propose a regulator that presents an alternative characterization, both in terms of construction and functionality, compared to traditional ones.

SUMMARY

All the objects mentioned herein, considered either individually or in any combination thereof, and others which will result from the following description are achieved, according to the invention, with a regulator as defined below and in the appended claims.

BRIEF DESCRIPTION OF THE DRAWINGS

The present invention is further clarified below in some of its preferred practical embodiments reported for purely exemplifying and non-limiting purposes with reference to the attached tables of drawings, wherein.

4

Figures 1, 2:
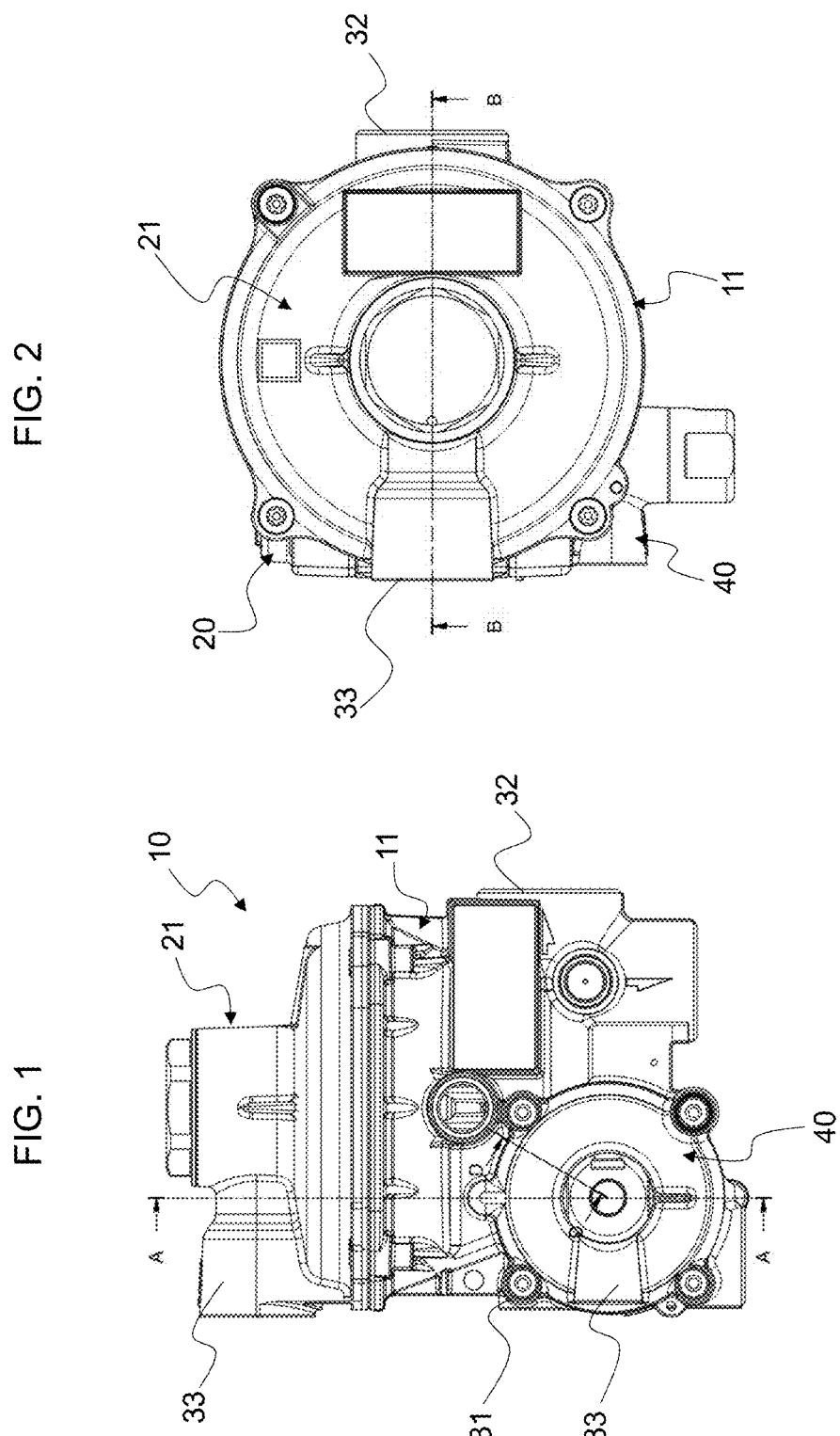
FIG. 1 shows a side view of the regulator according to the invention.
Figure 3A:
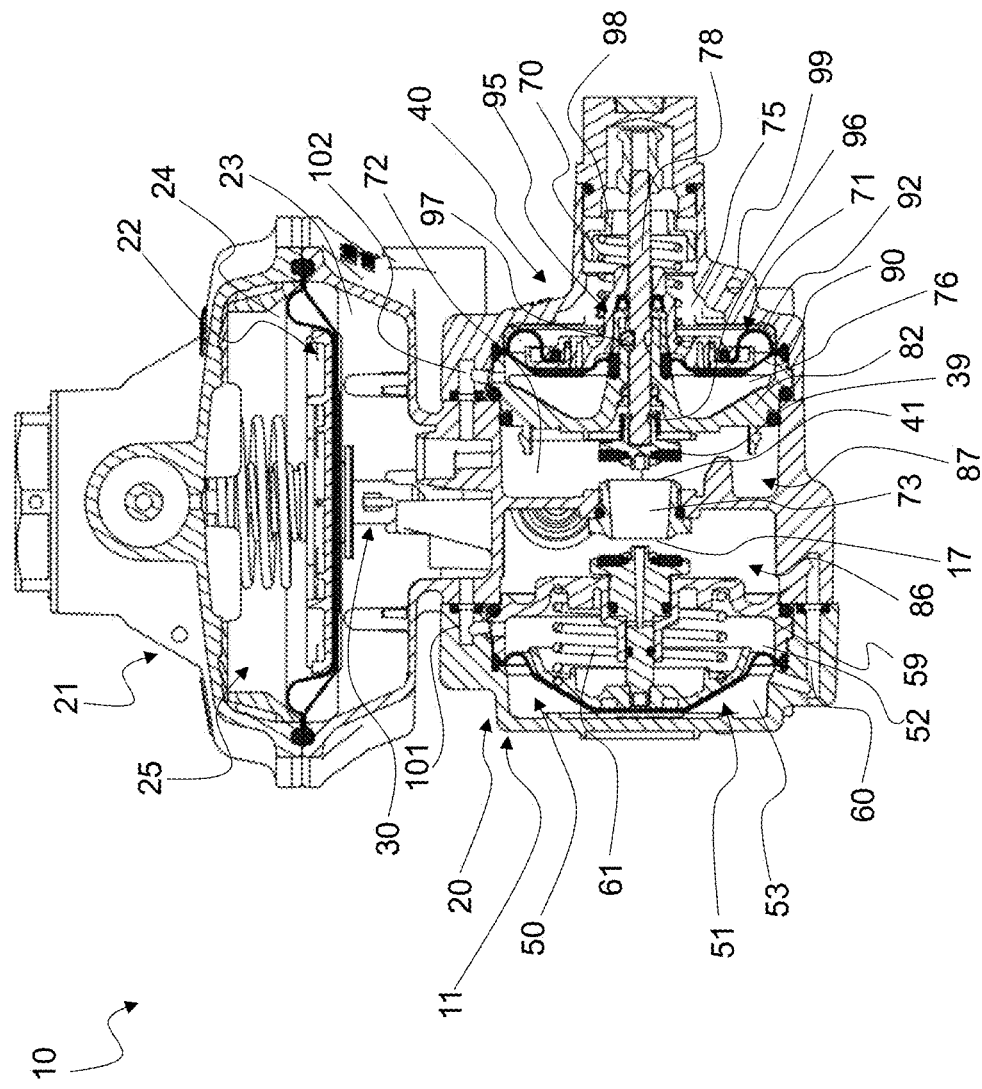
Figure 3B:
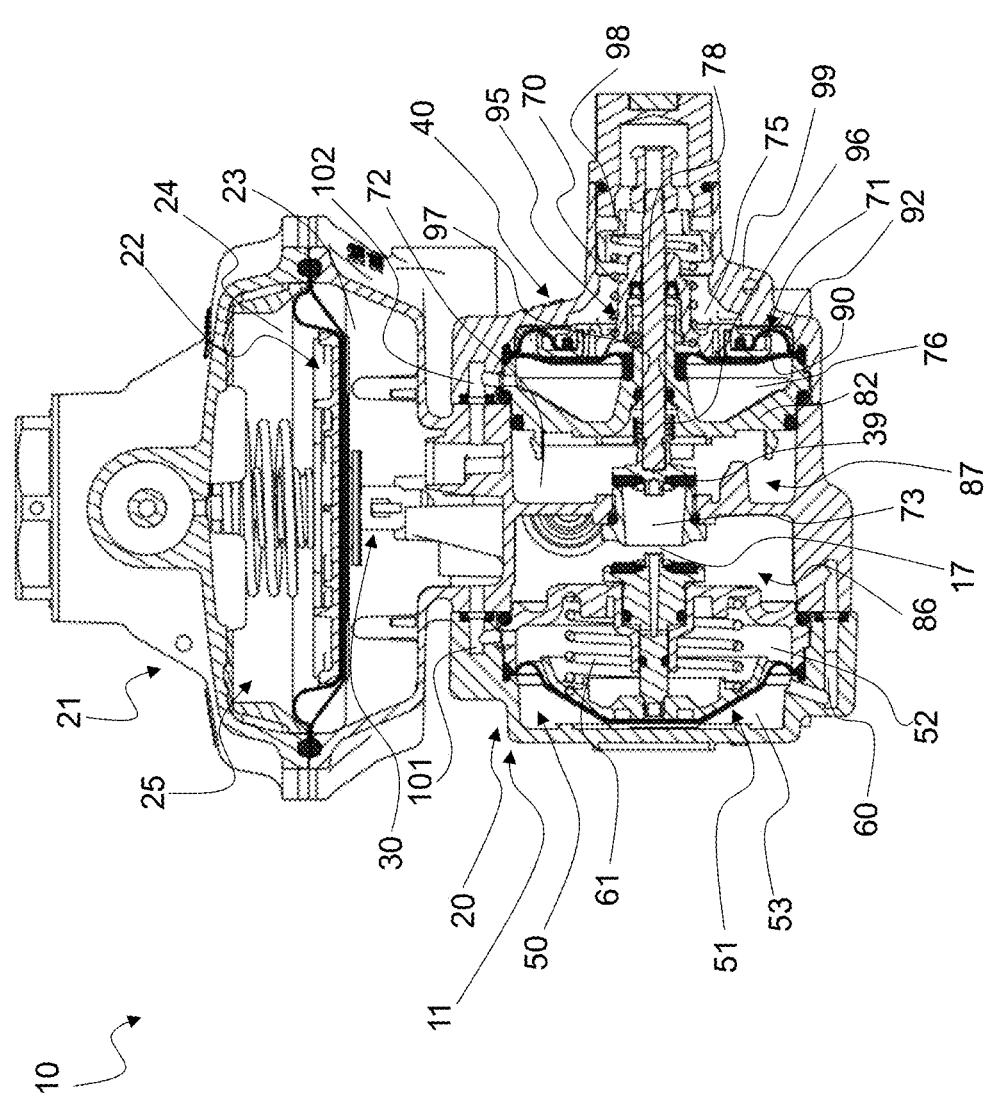
Figure 3C:
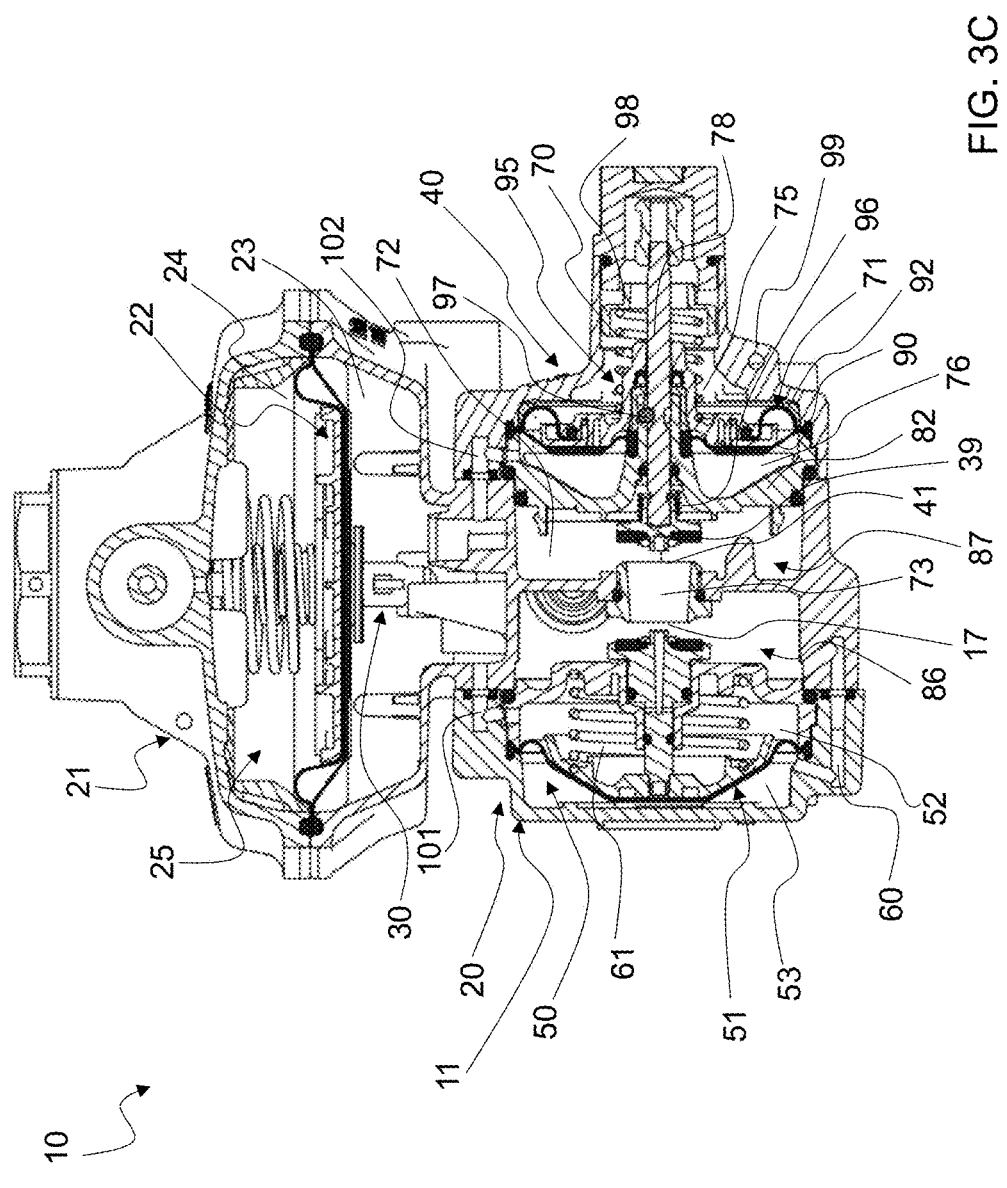
Figure 3D:
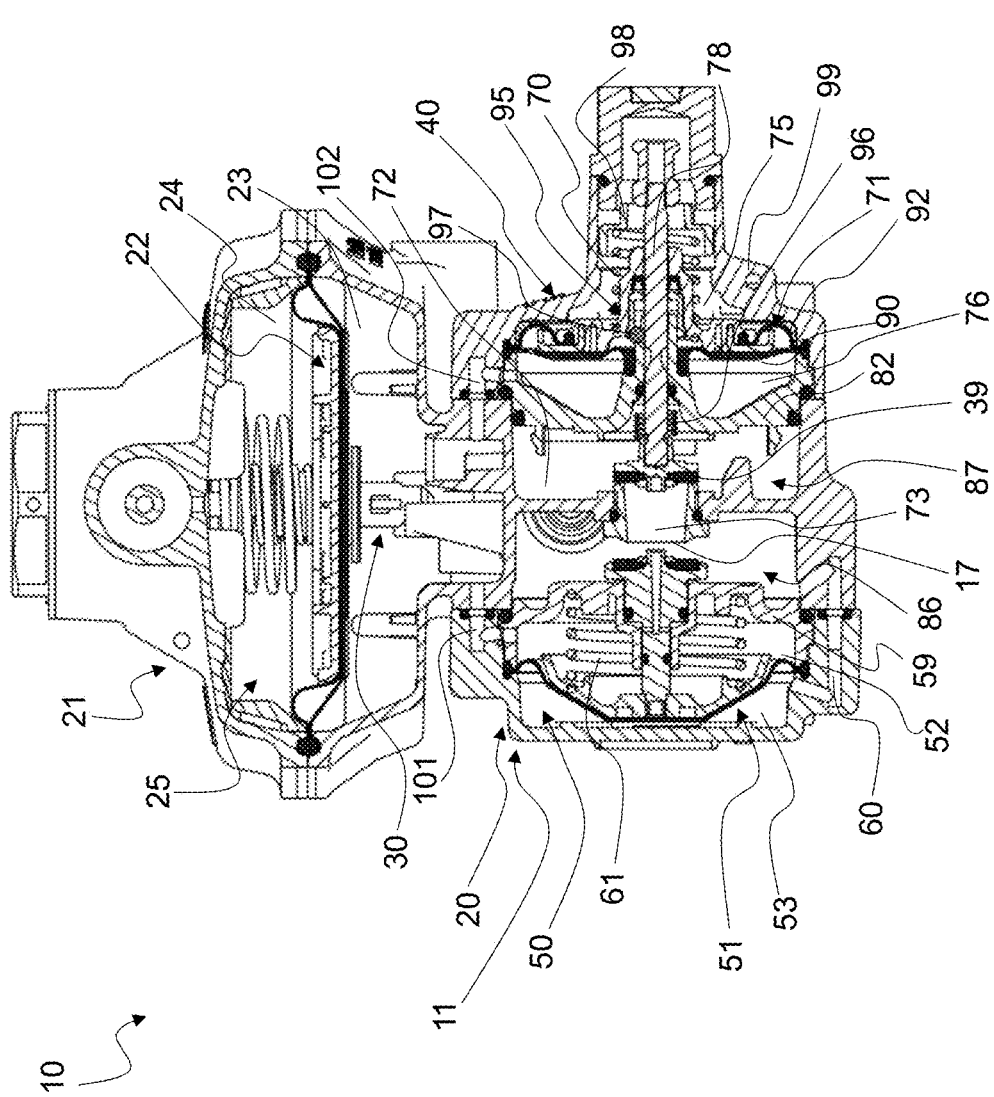
Figure 4A:
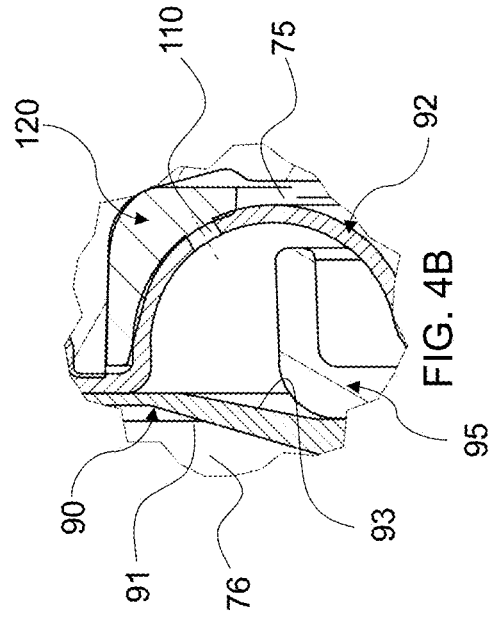
Figure 4B:
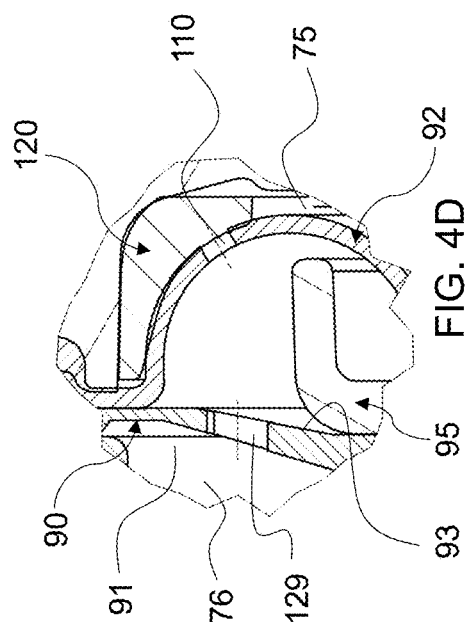
Figure 4C:
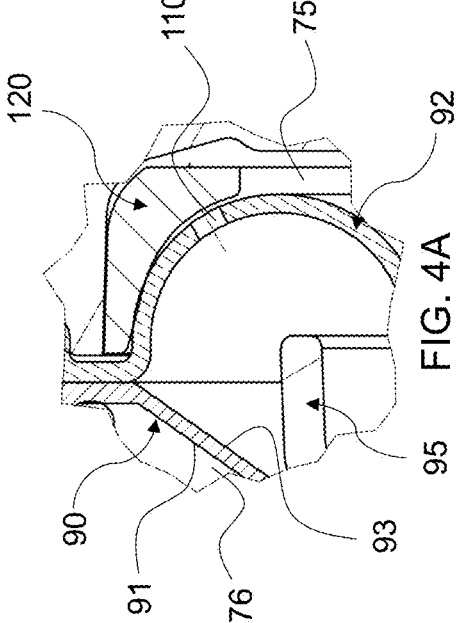
Figure 4D:
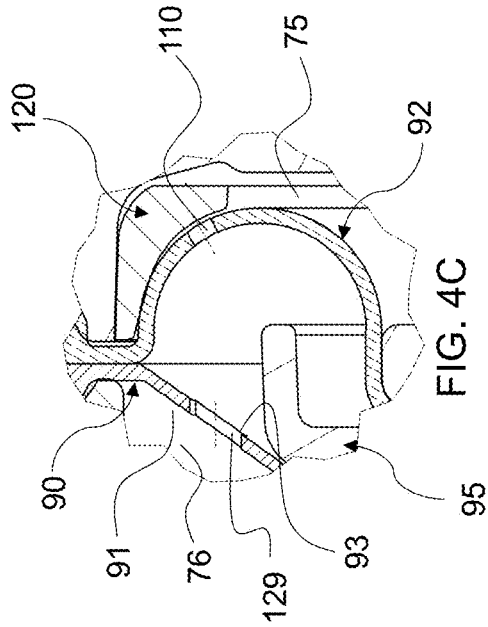
Figures 5, 6:
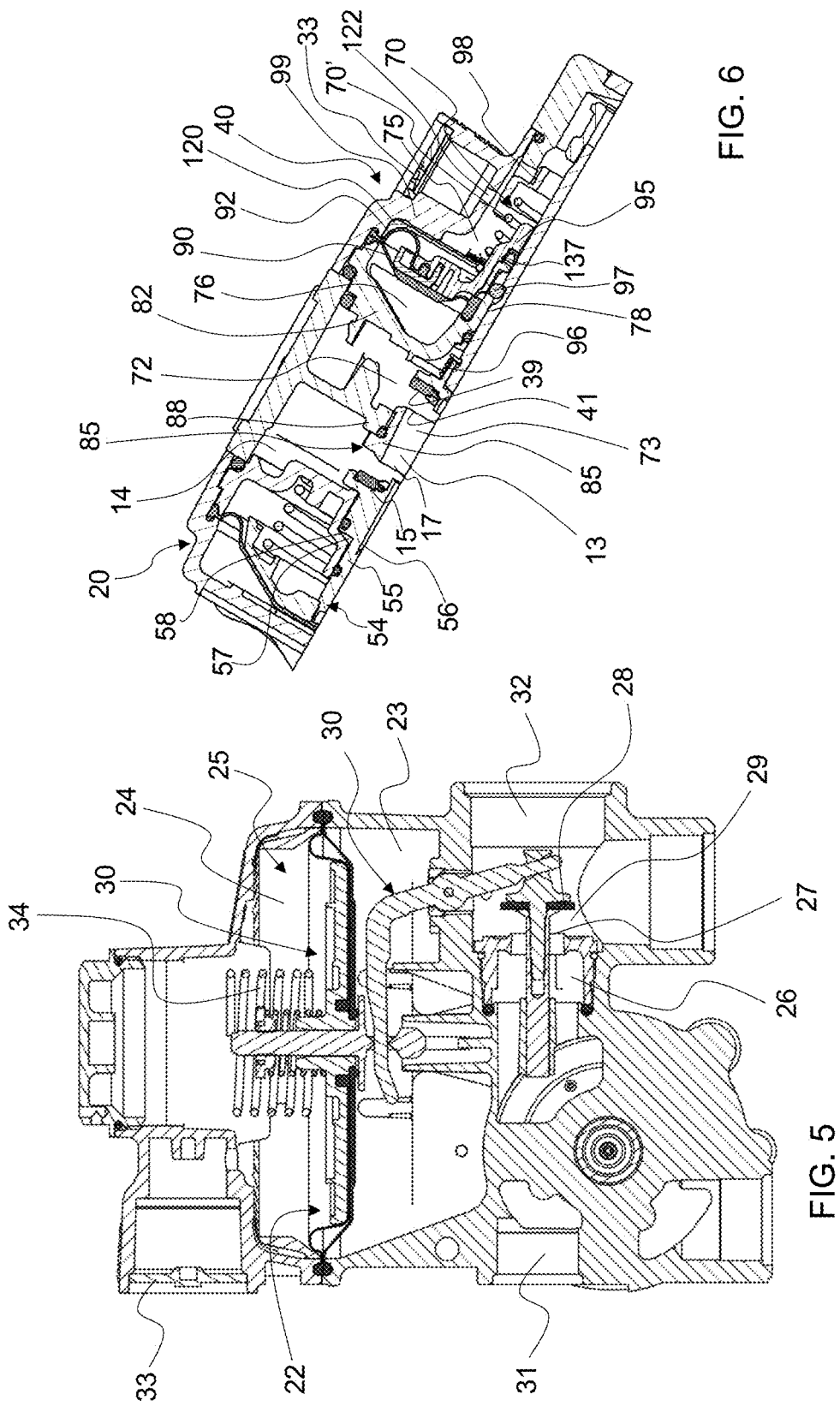
Figures 7, 7A:
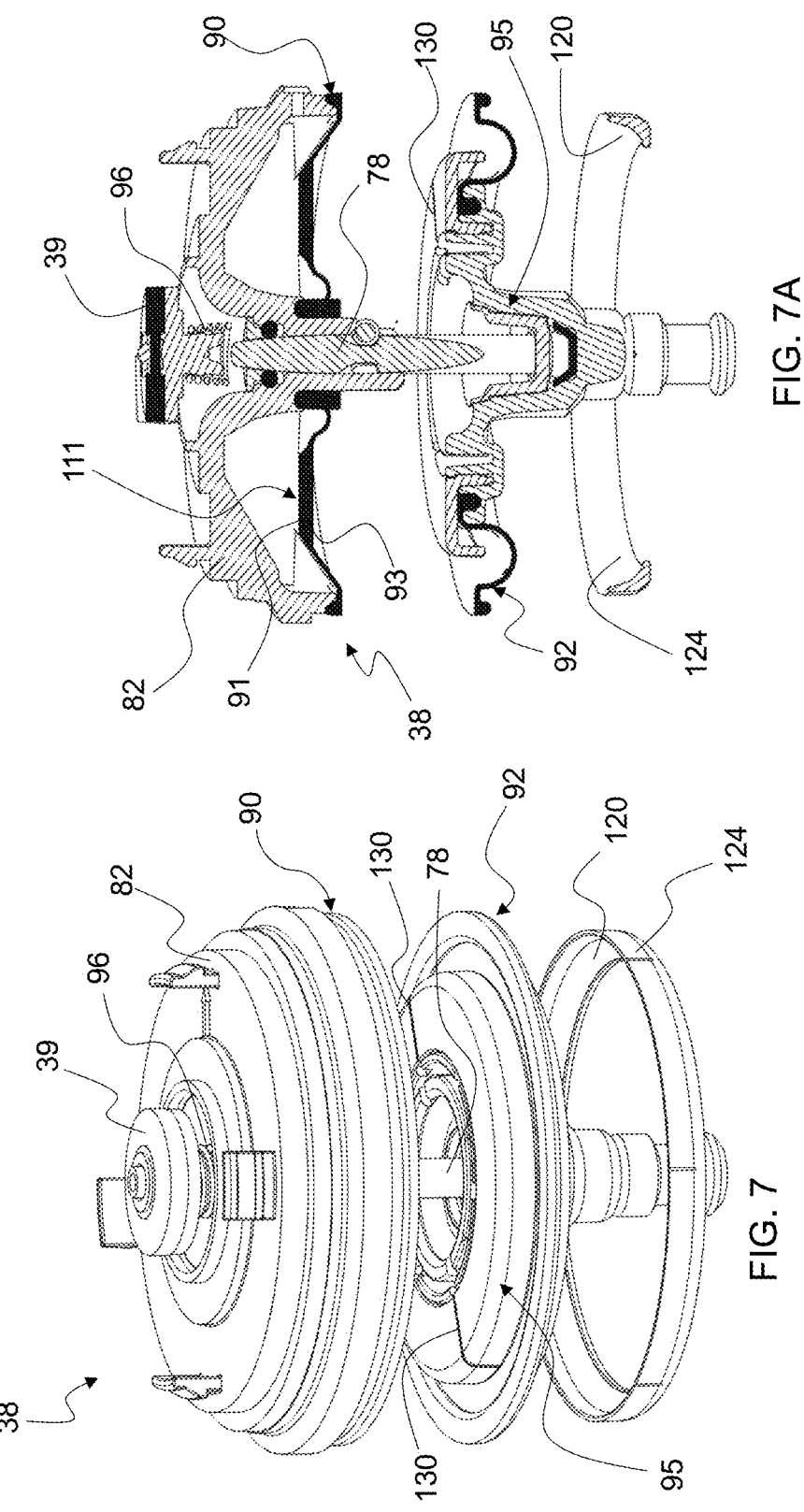

FIG. 2 shows the regulator of FIG. 1 according to a plan view,

FIG. 3A shows a view of the regulator according to section A-A of FIG. 1 wherein the safety block is intact (i.e. in the absence of faults or breakdowns) and in the deactivated condition, FIG. 3B shows a view of the regulator according to section A-A of FIG. 1 wherein the safety block is intact (i.e. in the absence of faults or breakdowns) and in the activated condition, FIG. 3C shows a view of the regulator according to section A-A of FIG. 1 where the safety block has the first membrane which is damaged and is in the deactivated condition, FIG. 3D shows a view of the regulator according to section A-A of FIG. 1 where the safety block has the first membrane which is damaged and is in the activated condition, FIGS. 4A-4D show an enlarged detail of the respective FIGS. 3A-3D, FIG. 5 shows a view of the regulator according to section B-B of FIG. 2, FIG. 6 shows a view of the regulator according to section B-B of FIG. 2, FIG. 7 shows a perspective view of the safety block without its housing cavity and without the pushing means acting on the structure 95 so as to bring it into contact with the first movable dividing element, and FIG. 7A shows a section of FIG. 7.

DETAILED DESCRIPTION OF THE PREFERRED EMBODIMENTS

As shown in the figures, the present invention concerns a regulator 10 for a gas control apparatus and, in particular, of the type suitable for installation in a gas transport and/or distribution network.

Preferably, the regulator 10 is suitable to be used in a domestic setting, but it could also be used in an industrial setting.

In particular, the control apparatus may be a traditional apparatus (direct or pilot-operated) configured to cause a reduction in the pressure of the gas passing through it, and in particular it is suitable for causing the reduction of the gas pressure from a higher upstream value to a lower downstream pressure value.

The regulator 10 comprises a containment body (structure) 11 which can be made in a single piece or, preferably, in several pieces suitably fixed together; preferably, the containment body 11 comprises within it a plurality of chambers, cavities and passages, as described in greater detail below.

The regulator 10 comprises a gas inlet 31 and a gas outlet 32. Preferably, the regulator 10 may also comprise at least one passage 33 for fluid connection to the external environment wherein said regulator is intended to be installed. Conveniently, the gas inlet 31, the gas outlet 32 and, if provided, said passage 33 are obtained on the containment body 11. Preferably, corresponding fittings are provided on the containment body 11, at the gas inlet 31 and the gas outlet 32, for the connection respectively with a section of upstream piping and with a section of downstream piping.

Conveniently, inside the containment body 11, the regulator 10 comprises:

at least one regulation stage 20 and/or 21 configured to cause a reduction in the pressure of the gas which, passing through the regulator 10, passes from the inlet 31 to the outlet 32, a safety block 40 which includes:

a further passage opening 41 between an upstream zone 72 and a downstream zone 73, a further shutter 39 for the complete closure of said further passage opening 41, a further control head 71 comprising a further group 38 for the controlled movement of the further shutter 39, and wherein the further group 38 comprises:

a first movable dividing element 90 with a first side 91 on which directly acts gas at pressure Pu, which corresponds to the pressure of the gas exiting the regulator 10 or downstream of the regulator itself, a second movable dividing element 92 which is positioned or faces (at least in part) a second side 93 of the first dividing element 90 which is opposite to said first side 91 of said first movable dividing element 90 on which the gas at pressure Pu acts.

The safety block 40 is configured so that:

when the first movable dividing element 90 is intact and/or free of breaks or punctures, the second movable dividing element 92 is associated with said first movable dividing element 90 so as to be integral in movement with the first movable dividing element 90, and when the first movable dividing element 90 is damaged and/or has breaks or punctures, the second movable dividing element 92 moves independently from the first movable dividing element 90.

Advantageously, therefore, the gas at pressure Pu comes to act directly on the second movable dividing element 92 only by crossing the first movable dividing element 90 from side to side and such crossing occurs in the event of breakage, puncture or in any case damage of said first element.

Conveniently, the first movable dividing element 90 is the dividing element on which the gas at pressure Pu acts—and in particular directly pushes—when the safety block 40 is intact and, therefore, it is the dividing element that works when the safety block 40 is intact.

Conveniently, the second movable dividing element 92 is the dividing element on which the gas at pressure Pu acts—and in particular directly pushes—when the first dividing element 90 is damaged (in particular it is broken or punctured) and, therefore, it is the dividing element that works only in the event of damage to the first movable dividing element 90. In essence, the second movable dividing element 92 acts as a back-up/reserve movable dividing element in the event of damage of the first movable dividing element 90.

Conveniently, the second movable dividing element 92 has at least a portion facing the first movable dividing element 90 which is spaced from the latter. Advantageously, between the first and the second movable dividing elements 90, 92 a volume is defined which is sealed when the first movable dividing element is intact, while the same volume is filled by the gas at pressure Pu when the first movable dividing element 90 is damaged.

The safety block 40 is configured to:

operate normally open, cause, when activated, the closing of said further passage opening 41, be controlled on the basis of the gas pressure Pu, which corresponds to the gas pressure exiting the regulator 10 or downstream of the regulator itself.

Preferably, the first movable dividing element 90 is made entirely or mostly of elastically deformable material. More preferably, the first movable dividing element 90 comprises a first membrane. Ideally, the first movable dividing element 90 consists of a first membrane of annular shape.

Preferably, the second movable dividing element 92 is made entirely or mostly of elastically deformable material. Preferably, the second movable dividing element 92 comprises a second membrane. Ideally, the second movable dividing element 92 consists of a second membrane of annular shape.

Preferably, the first membrane of the first movable dividing element 90 and the second membrane of the second movable dividing element 92 may be made of the same material.

In particular, the safety block 40 is configured so that the gas at pressure Pu and thrust means 70 act on the further group 38 in opposite directions. Preferably, the gas at pressure Pu acts on the group 38 in a direction corresponding to the movement of the further shutter 39 away from the further passage opening 41, while the thrust means 70 act on the group 38 in an opposite direction corresponding to the movement of the further shutter 39 towards the further passage opening 41. More preferably, the gas at pressure Pu and the thrust means 70 act on the further group 38 in opposite directions and, when it reaches and is in a certain position, releases the shaft 78 which—through further thrust means 96—pushes the further shutter 39 towards the closure of the further passage opening 41.

Conveniently, said at least one regulation stage of the regulator 10 may comprise a first regulation stage 20 and/or a second regulation stage 21. In particular, the regulator 10 may comprise exclusively a single regulation stage or may comprise two regulation stages, fluidically in series, and in particular a first regulation stage 20 and a second regulation stage 21 which is downstream of the first stage.

Said at least one regulation stage 20 and/or 21 and the safety block 40 are defined and housed inside the containment body 11.

The first regulation stage 20 is configured to cause a reduction in the pressure Pm of the gas entering the regulator 10 from the inlet 31. The second regulation stage 21, if provided, causes a reduction in the gas pressure further than that effected by the first stage 20.

The safety block 40 is normally open and, when activated, is configured to prevent the gas entering the regulator from the inlet 31 from reaching the outlet 32 of the regulator itself, and in particular to prevent the gas from passing through the further passage opening 41 which is located between the inlet 31 and the outlet 32 and, in particular, is defined in a fluid path which, inside the containment body 11, connects the inlet 31 with the outlet 32.

First Regulation Stage 20

In particular, the first regulation stage 20 comprises:

a first passage opening 17 between a first zone 13 and a second zone 14 which is downstream of said first zone 13, a first movable shutter 15 for obstructing the first passage opening 17, a first control head 50 comprising a first movable group 54 for the controlled movement of the movable shutter 15.

Preferably, in the possible embodiment illustrated in the figures, the further regulation stage 21 is interposed and acts in the fluid path of the gas between the first zone 13 and said gas inlet 31.

Conveniently, therefore, the gas in the first zone 13 of the regulator 10 is at the pressure Pm which corresponds to the pressure of the gas entering the regulator 10, and therefore to the pressure of the gas upstream of the regulator itself.

Conveniently, the first movable shutter 15 is movable with respect to the first passage opening 17 so as to vary (at the inlet or, preferably, at the outlet) the obstruction of the passage opening of the gas from the first zone 13 to said second zone 14, thus causing a corresponding reduction in pressure of the gas that passes from said first zone 13 to said second zone 14 through the passage opening itself. Therefore, the gas in the second zone 14 is at a pressure Pr that is lower/reduced with respect to the pressure Pm of the first zone 13.

Conveniently, the first control head 50 comprises a chamber wherein a first dividing element 51 is housed which is movable and which divides the chamber itself into a first sub-chamber 52 and a second sub-chamber 53.

The first dividing element 51 is mechanically connected—or in any case integral in movement—with the first movable shutter 15, to thus control the movement of the latter with respect to the first passage opening 17. Preferably, the first dividing element 51 is mechanically connected to the first movable shutter 15 by means of a first movable group 54 which, more preferably, comprises a first shaft 55 which at one end is fixed centrally to the first dividing element 51 and at the other end supports or defines the first movable shutter 15. Ideally, the first shaft 55 may comprise two sections, one of which has a greater radial development than the other.

Preferably, said first regulation stage 20 is of the balanced type and, in particular, is configured so as to use/draw the gas at pressure Pm—which can indicatively be between approximately 350 mbar (5 PSI) and 8.6 bar (125 PSI)—to balance the movement of the first movable group 54 resulting from the thrust that the gas—and in particular the gas at pressure Pm present in the first zone 13—exerts directly on the face/part of the first shutter 15 facing the first passage opening 17. More preferably, for this purpose, a first circuit 56, which fluidically connects the first zone 13 with a first balancing chamber 57, is obtained from the face of the first movable shutter 15 acting inside the second zone 14 and facing the first passage opening 17. Ideally, in a possible embodiment, the first circuit 56 can comprise one or more ducts obtained inside the first shaft 55 of the first movable group 54. Ideally, in a possible embodiment, the first balancing chamber 57 can be delimited by a first radial widening section 58 of the first shaft 55 of the first moving group 54 and by a first wall 59, which is crossed by the first moving group 54 so as to act as a support and track for the movement of the moving group. Conveniently, in this way, the thrust exerted on the first movable shutter 15 of the first movable group 54 by the gas at pressure Pm (i.e. the gas before it undergoes the pressure reduction by passing through the obstruction defined by the first shutter at the first passage opening) is substantially balanced by the thrust, directed in the opposite direction, which is exerted on the first radial widening 58 of the first movable group 54 by the pressure of the gas which is present in the first balancing chamber 57 and which, having arrived in said balancing chamber through the first circuit 56, corresponds to the pressure of the gas present in the first zone 13. Preferably, the first wall 59 is fixed or in any case independent with respect to the movement of the first movable group 54 and can be made of rigid material, possibly including a portion of elastic material (for example a membrane) to delimit the first balancing chamber 57.

Preferably, the first control head 50 is configured so that on the first moving group 54 they act:

in a first direction of distancing of the first shutter 15 from the first opening 17, a first spring 61 and gas at pressure Pu corresponding to the downstream/outlet pressure of the regulator 10, in a second direction, which is opposite to the first direction, the gas at pressure Pr corresponding to the pressure that has been reduced by the action of the first shutter 15 on the first passage opening 17.

More preferably, for this purpose, in a possible embodiment, said first sub-chamber 52 can be fluidically connected to an outlet zone and/or to a duct exiting said regulator 1. Preferably, the first sub-chamber 52 is defined between the first wall 59 and the first movable dividing element 51.

Conveniently, therefore, in the first sub-chamber 52 of the first control head 50 of the first regulation stage 20 there is gas at a pressure corresponding to the downstream/outlet pressure Pu of the regulator 10.

Preferably, said second sub-chamber 53 can be fluidically connected to the second zone 14 by means of a corresponding fluid connection section 60. Conveniently, therefore, the second sub-chamber 53 of the first control head 50 of the first regulation stage 20 is at a gas pressure Pr corresponding to the pressure that has been reduced by the obstructing action of the first shutter 15 on the first passage opening 17.

Conveniently, a first spring 61 also acts on the first movable dividing element 51, which is preferably housed in the first sub-chamber 52. Conveniently, the first spring 61 consists of a helical spring interposed between the first wall 59 and the first movable dividing element 51 so as to operate by pushing on the latter.

In another possible embodiment not illustrated in the figures, the first control head 50 is configured so that on the first movable group 54 they act:

in a first direction of distancing of the first shutter 15 from the first passage opening 17, a first spring 61, possibly, with air at atmospheric pressure coming from a fluid connection with the environment wherein the regulator is intended to be installed, in a second direction, which is opposite to the first direction, gas at pressure Pr corresponding to the pressure that has been reduced by the action of the first shutter 15 on the first passage opening 17.

Preferably, the first regulation stage 20 is of the "fail to open" type, i.e. it is configured so that, in the event of a failure/breakage, it moves into an open condition (i.e. the first shutter 15 of the first regulation stage 20 moves away from the first passage opening 17). In particular, to this end, the first spring 61 acts on the first movable dividing element 51 so that its elongation causes, through the first movable group 54 which is fixed or integral with said dividing element, the movement of the first shutter 15 away from the first passage opening 17.

In a possible embodiment of the regulator 10 (not illustrated in the figures), in the regulator 10, there are no other regulation stages downstream of the first regulation stage 20. In this case, therefore, the second zone 14 is fluidically connected directly to the gas outlet 32 and, therefore, the pressure Pu of the gas exiting the regulator corresponds to the pressure Pr which has been reduced by the first regulation stage 20 alone and which is lower/less than Pm.

Second Regulation Stage 21

In another possible and preferred embodiment which is illustrated in the figures, in the regulator 10, downstream of the first regulation stage 20, a second regulation stage 21 can be provided which is configured to cause a further reduction in the gas pressure and, in particular, causes a reduction of the pressure Pr at the outlet of the first regulation stage 20.

Conveniently, the second regulation stage 21 can be of the traditional type.

In more detail, the second regulation stage 21 may comprise:

a third zone 26 which is fluidly connected to said second zone 14 (or which may correspond with/comprise at least in part said second zone 14), a second passage opening 27 between the third zone 26 and a fourth zone 29 which is downstream of said third zone 26, a second movable shutter 28 for blocking the second passage opening 27, a second control head 25 comprising a second movable group 30 for the controlled movement of the second movable shutter 28.

Preferably, the second control head 25 is configured so that the following act on the second movable group 30:

a second spring 34 in a first direction of distancing of the second shutter 28 from the second opening 27, in a second direction, which is opposite to the first direction, the gas at pressure Pu corresponding to the downstream/outlet pressure of the regulator 10.

Conveniently, the second control head 25 comprises a second chamber wherein a second dividing element 22 is housed which is movable and which divides the second chamber itself into a third sub-chamber 23 and a fourth sub-chamber 24.

The second dividing element 22 is mechanically connected to the second movable shutter 28 by means of a second movable group 30, to thus control the movement of the latter with respect to the second passage opening 27. Preferably, the second dividing element 22 is mechanically connected to the second movable shutter 28 by means of a second movable group 30 comprising mechanical transmission means. Ideally, in a possible embodiment, the mechanical transmission means comprise a shaft which is fixed centrally to the second dividing element 22 and which acts on an articulated lever which acts on a rod which in turn supports said second shutter 28.

Preferably, said third sub-chamber 23 can be fluidically connected to an outlet zone and/or to a duct exiting from said regulator 1. More preferably, said third sub-chamber 23 can be fluidically connected to the fourth zone 29. Conveniently, therefore, in the third sub-chamber 23 of the regulator 10 there is gas at a pressure corresponding to the downstream/ outlet pressure Pu of the regulator 10.

Preferably, said fourth sub-chamber 24 can be fluidically connected with a passage 33 which is intended to be in direct fluidic connection with the environment external to the regulator itself. Conveniently, therefore, in the fourth sub-chamber 24 of the regulator 10 there is gas at a pressure corresponding to the atmospheric pressure of the environment wherein the regulator itself is intended to be installed.

Conveniently, a second spring 34, which is preferably housed in the fourth sub-chamber 24, also acts on the second dividing element 22. Conveniently, the second spring 34 consists of a helical spring placed between a spring-pressing cap and the second dividing element 22 so as to operate by pushing on the latter.

Preferably, the second regulation stage 21 is of the "fail to open" type, i.e. it is configured so that, in the event of a failure/breakage, it moves into an open condition (i.e. the shutter of the second regulation stage 21 moves away from the second passage opening 27). In particular, to this end, the second spring 34 acts on the second dividing element 22 so that its elongation causes, through the second movable group 30, the second shutter 28 to move away from the second passage opening 27.

Conveniently, therefore, the gas in the third zone 26 of the regulator 10 is at the pressure Pr which corresponds to the pressure of the gas in the second zone 14, i.e. to the pressure of the gas exiting the first regulation stage 20.

Conveniently, the second movable shutter 28 is movable with respect to the second passage opening 27 so as to define an obstruction at said second passage opening of the gas from the third zone 26 to said fourth zone 29, thus causing a corresponding reduction in gas pressure from said third zone 26 to said fourth zone 29. Therefore, the gas in the fourth zone 29 is at a Prr which is lower/reduced with respect to the pressure Pr of the second zone 14 and of the third zone 26. In this case, therefore, the fourth zone 29 is fluidically connected with the gas outlet 32 and, therefore, the pressure of the gas exiting Pu from the regulator corresponds to the pressure Prr which is lower/less than Pr and is also lower/less than Pm.

Conveniently, the second regulation stage 21 is not of the balanced type and, in particular, is not configured to balance the movement of the second movable group 30 resulting from the thrust that the gas exerts directly on the face/part of the second shutter 28 facing the second passage opening 27.

Safety Block 40

As mentioned, the regulator 10 comprises, inside the containment body 11, the safety block 40 which is normally open and which is activated on the basis of the gas pressure Pu, and in particular it is activated when the thrust of the gas at pressure Pu operated on the group 38 exceeds an activation pressure value Ps, preferably preset through calibration, thus causing the interruption of the gas flow emission downstream through the outlet 32 of the regulator 10.

The regulator 10 comprises a further group 38 with a further shutter 39 for the obstruction of a further passage opening 41 which is placed between the inlet 31 and the outlet 32 and, in particular, is defined in a fluid path which, inside the containment body, connects the inlet 31 and the outlet 32. Preferably, the thrust means 70 and the gas at pressure Pu exiting the regulator 10 or downstream from the regulator 10 act on the further group 38 in opposite directions.

The safety block 40 is configured so that:

the gas at pressure Pu acts on the group 38 in a direction corresponding to the movement of the further shutter 39 away from the further passage opening 41, while the thrust means 70 act on the group 38 in an opposite direction corresponding to the movement of the further shutter 39 towards the further passage opening 41.

More preferably, the gas at pressure Pu and the thrust means 70 act on the further group 38 in opposite directions and, when it reaches and is in a certain position, releases the shaft 78 which—through further thrust means 96—pushes the further shutter 39 towards closing the further passage opening 41.

The safety block 40 is normally open and, in particular, in conditions of correct functioning of the regulator 10, i.e. in the absence of failure of the first regulation stage 20 and/or of the second regulation stage 21 of the same regulator, the action of the thrust means 70 on the further group 38 exceeds the action that is exerted on the group itself by the gas at pressure Pu.

Preferably, the force/action exerted by the thrust means 70 on the further group 38 is set so as to be lower than an activation value Ps which—for example—is preferably defined within the range 30-350 mbar, more preferably within the range 45-230 mbar. Conveniently, the activation pressure value Ps is lower than a safety limit value, provided by the corresponding sector regulations, of the pressure Pu permitted downstream. Ideally, the activation value Ps depends on the action exerted by the thrust means 70 and, in particular, can be defined entirely or at least in part (more preferably for the most part) by the action exerted by the thrust means 70.

Conveniently, said safety block 40 is calibrated—in particular by varying/defining the force exerted by the thrust means 70 on the further group 38—so that the thrust exerted by the thrust means 70 overcomes that exerted on the group itself by the gas at pressure Pu as long as Pu is lower than the activation value Ps.

When the thrust exerted on the further group 38 by the gas pressure Pu exceeds the activation value Ps, and preferably exceeds the action exerted on said further group 38 by the thrust means 70, then the safety block 40 is activated to thus bring the further shutter 39 from an open position wherein it is spaced with respect to the further through opening 41 to a closed position wherein it completely closes/plugs the further through opening 41, thus preventing the passage of gas through said further through opening 41.

Preferably, the safety block 40 comprises a further fixed wall 82 which separates the upstream zone 72 from the further control head 71. Ideally, the regulator 10 comprises a further cavity 87; at least a part of the upstream zone 72 and also the further control head 71 of the safety block 40 are arranged/defined within said further cavity 87.

Preferably, the further control head 71 comprises a chamber wherein the first movable dividing element 90 and the second movable dividing element 92 of the further group 38 are housed so as to divide the chamber itself into a further first sub-chamber 75 and a further second sub-chamber 76.

Preferably, the further shutter 39 is movable within the upstream zone 72.

Preferably, the further group 38 comprises a structure 95 which is movable between:

a first position (see FIGS. 3A and 3C) corresponding to a condition of deactivation of the safety block 40 wherein therefore the further shutter 39 is spaced from the further passage opening 41, a second position (see FIGS. 3B and 3D) corresponding to an activation condition of the safety block 40 wherein therefore the further shutter 39 completely closes the further passage opening 41.

In particular, when the structure 95 is in the first position, the safety block 40 is in the deactivated condition with the further passage opening 41 being open and not closed/plugged by the further shutter 39 (in particular, the latter is spaced from said opening); when the structure 95 is in the second position, the safety block 40 is in the activated condition with the further passage opening 41 being completely closed/plugged by the further shutter 39. In essence, it is the movement of the structure 95 from the first position to the second position that thus brings the safety block 40 from a deactivated condition to an activated condition wherein the further shutter 39 closes the further passage opening 41.

Conveniently, the movement of the structure 95 from the first position to the second position is controlled:

when the first movable dividing element 90 is intact, by the thrust that the gas at pressure Pu exerts on said first movable dividing element 90 in contrast with the action exerted by the thrust means 70, when the first movable dividing element 90 is not intact, by the thrust that the gas at pressure Pu exerts on said second movable dividing element 92 in contrast with the action exerted by the thrust means 70.

In particular, when the thrust of the gas at pressure Pu on the first movable dividing element 90 (see FIG. 3A), or on the second movable dividing element 92 in the event of damage (breakage or puncture 129) of the first movable dividing element 90 (see FIG. 3C), is lower than the activation value Ps, and is therefore overcome by the thrust exerted by the thrust means 70, then the structure 95 is and remains in the first position corresponding to the deactivation condition of the safety block 40; when the thrust of the gas at pressure Pu on the first movable dividing element 90 (see FIG. 3B), or on the second movable dividing element 92 in the event of damage (breakage or puncture 129) of the first movable dividing element 90 (see FIG. 3C), is greater than the activation value Ps, and therefore overcomes/surpasses the thrust exerted by the thrust means 70, then the structure 95 passes into the second position corresponding to the activation condition of the safety block 40.

Conveniently, during the normal operation of the regulator 10 (see FIGS. 3A and 3C), in particular, in conditions of correct operation of the regulator 10, i.e. in the absence of failure of the first regulation stage 20 and/or of the second regulation stage 21 of the same regulator, the pressure Pu of the outgoing gas is suitably reduced by said first and/or second stage so as to be below a limit value (or in any case below a safety value) and, therefore, the action of the thrust means 70 on the structure 95 exceeds the action that is exerted on the first movable dividing element 90, or on the second movable dividing element 92, by the gas at pressure Pu. In this case, therefore, the structure 95 is in the first position and, therefore, the safety block 40 is deactivated.

Conveniently, the further shutter 39 is mechanically activated by said structure 95 and/or connected to said structure 95.

Ideally, the further group 38 comprises said structure 95 and a further shaft 78 on which, at one end, the further shutter 39 is fixed. More preferably, the structure 95 comprises centrally a tubular section which is passed through by the further shaft 78 and which acts as a support and track for the movement of the further shaft 78. Ideally, the movement of the further shaft 78 with respect to the structure 95 can be selectively blocked or unblocked based on the position of the structure 95. More preferably, the further fixed wall 82 can comprise centrally a tubular section which is passed through by the further shaft 78 and which acts as a support and track for the movement of the further shaft 78.

Preferably, further thrust means 96 act on the further shutter 39 in such a way as to push it towards the further passage opening 41, i.e. in such a way as to push it towards the closed position (i.e. wherein the further shutter 39 closes/plugs the further passage opening 41). More preferably, the thrust means 96 comprise a corresponding further helical spring, which can be passed through by the further shaft 78, and which is interposed between the further fixed wall 82 (or in any case a fixed element) and the further shutter 39.

Preferably, the further group 38 comprises a mechanism, which is operated/controlled by the movement of the structure 95, and which:

when said structure is in said first position, it is configured to block the further shaft 78 to the structure 95, and when said structure is in said second position, it is configured to release from the structure 95 the thrust movement of the further shaft 78 towards the closure of the further passage opening 41.

In particular, said mechanism, which is operated/controlled by the movement of the structure 95, is configured to block/unblock the movement of the further shaft 78 so as to prevent/release the thrust action of said further thrust means 96 which push the further shutter 39 towards the closure of the further passage opening 41.

Ideally, in one possible embodiment, the structure 95 is movable between:

said first position (see FIGS. 3A and 3C) wherein the structure 95 acts, by means of a blocking member 97 (for example shaped like a sphere), on the further shaft 78 so as to prevent its movement and thus retain/block the action of said further thrust means 96 which push the further shutter 39 towards the closure of the further passage opening 41, said second position (see FIGS. 3B and 3D) wherein the structure 95 releases the movement of the further shaft 78 so that the action of said further thrust means 96 can push the further shutter 39 with the further shaft 78 towards the closure of the further passage opening 41.

Ideally, in a possible embodiment, when the structure 95 is in the first position, the blocking member 97 is held by a constriction of the structure 95 within a seat obtained in the further shaft 78; when the structure 95 is in the second position, the blocking member 97 is free to exit from the seat obtained in the further shaft 78.

As mentioned, the further control head 71 comprises a chamber wherein the first movable dividing element 90 and the second movable dividing element 92 of the further group 38 are housed so as to divide the chamber itself into a further first sub-chamber 75 and into a further second sub-chamber 76.

Preferably, said further first sub-chamber 75 can be fluidically connected to a passage 33. Therefore, the gas and/or air in said further first sub-chamber 75 is at a pressure corresponding to atmospheric pressure and, in particular, to the pressure of the environment wherein the regulator 10 is intended to be installed. Ideally, the further first sub-chamber 75 is delimited internally by a shell/lid 99 (or other equivalent element) and by the structure 95 with the second movable dividing element 92.

Conveniently, the thrust means 70 which, preferably, comprise a corresponding spring 70' which is housed in said further first sub-chamber 75, act on the structure 95. Suitably, the spring 70' is made up of a helical spring placed between a fixed cap 98 (or in any case an equivalent fixed element) and the structure 95 so as to act by pushing on the latter.

Preferably, said further second sub-chamber 76 can be fluidically connected to an outlet zone and/or to an outlet duct to said regulator 1. Conveniently, therefore, the further second sub-chamber 76 of the further control head 71 of the safety block 40 is at a pressure corresponding to the downstream/outlet pressure Pu of the regulator 10.

Conveniently, the further second sub-chamber 76 is defined between the further fixed wall 82 and the first movable dividing element 90.

Preferably, in a possible embodiment, the first movable dividing element 90 is made of elastically deformable material and has substantially the shape of an annular disk. In particular, the first movable dividing element 90 is constrained/fixed externally and also internally/centrally to a fixed component of the regulator 10. Preferably, the first movable dividing element 90 also comprises an annular sector 111—interposed between the externally and internally/centrally fixed portions—which is moved by the thrust of the gas at pressure Pu and which acts on the structure 95.

In particular, the gas at pressure Pu pushes and acts on the first side 91 of the first movable dividing element 90, while the second side 93 of said first element rests/is in contact or in any case is integral with the structure 95 so as to transmit the thrust of the gas at pressure Pu onto said structure. Ideally, the first movable dividing element 90 acts on the structure 95, on which the second movable dividing element 92 is fixed, resting on said structure 95, or in any case without being fixed to said structure.

More preferably, the first movable dividing element 90 is internally and externally constrained to a fixed component of the regulator, creating with it a closed chamber containing gas at pressure Pu. In this way, the first movable dividing element is mechanically released from the structure 95 of the further movable group 38, even if it rests on said structure with its annular sector 111. When the pressure Pu increases until it reaches the threshold value, the first movable dividing element 90 acts by pushing on the structure 95 which thus begins to move. Advantageously, since there are no pressure and sliding sealing elements (since the constraint points of the first movable dividing element 90 are fixed), sticking and/or hysteresis phenomena of the seals are avoided which would inevitably lead to a reduction in the intervention precision of the block 40.

Conveniently, the first movable dividing element 90 can be centrally/internally constrained—or in any case is integral—to the further fixed wall 82, while externally it can be constrained—or in any case is integral—to the internal lateral wall which delimits the further housing cavity 87, while the first side 91 of its annular sector 111 (which is interposed between the constrained edges/portions) is moved by the thrust of the gas at pressure Pu and thus acts with its second side 93 on the structure 95. Preferably, the annular sector 111 of the first movable dividing element 90 can have sections with different elasticity, for example of different thickness.

Preferably, in a possible embodiment, the second movable dividing element 92 is made of elastically deformable material, has a substantially annular shape and is externally integral with the first movable dividing element 90, while internally it is constrained/fixed to the structure 95. More preferably, the second movable dividing element 92 is fixed externally to the same fixed component of the regulator 10 to which the first movable dividing element 90 is fixed and, in particular, they are both fixed to the internal side wall that delimits the further housing cavity 87. Preferably, the second movable dividing element 92 can have a substantially curved/concave section with the concavity facing towards the first movable dividing element 90.

Preferably, the second movable dividing element 92 is configured so as to face (at least in part) an annular sector that is more external than the first movable dividing element 90, while the innermost annular sector of the latter faces the structure 95.

Ideally, the second movable dividing element 92 is internally constrained to the structure 95 and, in the event of breakage or puncture of the first movable dividing element 90, the gas at pressure Pu reaches the second movable dividing element 92 and the innermost part of the structure 95. Advantageously, therefore, the first and the second movable dividing elements 90, 92 are internally constrained to different structures.

Conveniently, the thrust means 70 are placed in the further first sub-chamber 75, thus being on the same side with respect to both the first and the second movable dividing elements 90, 92.

The safety block 40 comprises a gasket 137, preferably comprising an annular lip gasket, for sealing the gas at pressure Pu towards the further first sub-chamber 75; said gasket 137 being positioned on said structure 95 so as to be hit by the gas only in the event of breakage or puncture of the first movable dividing element 90; in essence, when the first movable dividing element 90 is intact and not damaged, the gas at pressure Pu does not reach the gasket 137 and, therefore, the latter is not stressed and so the resulting friction is substantially minimal and irrelevant. In particular, said gasket 137 is positioned between the further shaft 78 and a more internal part of the structure 95 and, more specifically, is fitted around the further shaft 78 in a position which is interposed between the further second sub-chamber 76 and the further first sub-chamber 75. Advantageously, given that the second movable dividing element 92 is provided with a hole 110—as described below—the main function of the gasket 137 is to ensure that the passage of gas through said second element 92 towards the further first sub-chamber 75 occurs exclusively through the hole 110, and not between the further shaft 78 and the more internal portion of the structure 95. More preferably, to reduce friction/sticking and consequently have better intervention performance, the gasket 137 comprises an annular lip gasket.

Preferably, in a possible embodiment, at least one channel 130 can be provided—ideally obtained on a face of the structure 95 facing towards the first movable dividing element 90—to convey the gas at pressure Pu which passes from side to side through the first movable dividing element 90 to the second movable dividing element 92. More preferably, on the face of the structure 95 on which the first movable dividing element 90 rests, at least one channel 130 is obtained, with a substantially radial development, having an extreme section facing at least in part a more central/internal annular sector of the first movable dividing element 90 while the other/opposite extreme section flows into/merges onto the second movable dividing element 92. Advantageously, this allows the gas to be brought to the second movable dividing element 92 even in the event of breakage and puncture 129 of the most central sector of the first movable dividing element 90; in essence, therefore, the gas at pressure Pu always arrives on the second movable dividing element 92 regardless of where the breakage or puncture 129 of the first movable dividing element 90 occurs.

Conveniently, when the first movable dividing element 90 is intact and undamaged (i.e. there are no breaks or punctures), the gas at pressure Pu—which arrives and is present in the further second sub-chamber 76—does not pass through said first element and, therefore, does not come into direct contact with the second movable dividing element 92, which—being fixed/integral with the same structure 95 on which the first dividing element 90 also acts—is thus substantially invisible and irrelevant for the purposes of the operation of the first movable dividing element 90. Therefore, in this case, the movement of the structure 95 from the first position to the second position, thus bringing the safety block 40 from a deactivated condition to an activated condition wherein the further shutter 39 closes the further passage opening 41, is controlled by the gas at pressure Pu which acts—in contrast to the action of the thrust means 70 acting on the structure 95—on the first movable dividing element 90 which is in contact/rests on the structure 95 (or in any case is integral with the latter in its movement).

Conveniently, when the first movable dividing element 90 is damaged (i.e. there are breaks or punctures), the gas at pressure Pu—which arrives and is present in the further second sub-chamber 76—passes through said first element from the first side 91 to the second side 93 and, therefore, comes into direct contact with the second movable dividing element 92 and thus pushes on the latter; the second movable dividing element 92—being fixed/integral with the same structure 95 on which the first dividing element 90 also acts—operates substantially in the same way as the first movable dividing element 90 operates when it is intact and undamaged. Therefore, in this case, the movement of the structure 95 from the first position to the second position, thus bringing the safety block 40 from a deactivated condition to an activated condition wherein the further shutter 39 closes the further passage opening 41, is controlled by the gas at pressure Pu which acts—in contrast to the action of the thrust means 70 acting on the structure 95—on the second movable dividing element 92 which is fixed to the structure 95 (or in any case is integral in movement with said structure).

Ideally, the second movable dividing element 92 is configured (in terms of size and shape/geometry) such that, when the first movable dividing element 90 is damaged (i.e. there are breaks or punctures), it triggers the block 40 at substantially the same calibration value—which is more preferably set by acting on the thrust means 70—for the first movable dividing element 90.

Preferably, the second movable dividing element 92 is made of elastically deformable material, has a substantially annular shape and is externally integral with the first movable dividing element 90, while internally it is constrained to the structure 95 so as to define a thrust/action surface for the gas at pressure Pu substantially equal to that of the first movable dividing element 90.

Preferably, the gas at pressure Pu—which is fed into the further second sub-chamber 76 to act directly on the first movable dividing element 90 or on the second movable dividing element 92 (in case of damage to the first movable dividing element 90)—is taken from a zone which is formed inside the containment body 11 of the regulator 10. Ideally, in a possible embodiment illustrated in the figures, the gas at pressure Pu which acts on the first movable dividing element 90 or on the second movable dividing element 92 can be taken from said fourth zone 29 of the second regulation stage 21.

Preferably, inside the containment body 11, a further fluid connection 102 is obtained to fluidly connect said further second sub-chamber 76 of the further control head 71 of the safety block 40 with a zone, which is defined inside the containment body 11 itself, wherein the gas is at the pressure Pu corresponding to the gas outlet pressure of the regulator 10, and therefore corresponding to the gas pressure downstream of the regulator 10.

Preferably, inside the containment body 11, a first fluid connection 101 is obtained to fluidly connect said first sub-chamber 52 of the first regulation stage 20 with a zone, defined inside the same containment body 11, wherein the gas is at the pressure Pu corresponding to the gas outlet pressure of the regulator 10, and therefore corresponding to the gas pressure downstream of the regulator 10.

Preferably, said safety block 40 is positioned upstream of the first regulation stage 20. In particular, said further passage opening 41 is positioned upstream with respect to said first passage opening 17.

Preferably, said safety block 40 is configured to prevent gas entering regulator 10 through inlet 31 from reaching outlet 32.

Preferably, the atmospheric pressure and, in particular, the pressure of the environment wherein the regulator 10 is intended to be installed, can also act on the further group 38 in a direction concordant with the thrust means 70 and in a direction opposite to the gas pressure Pu.

Preferably, said safety block 40 can face the first regulation stage 20.

Preferably, the further shutter 39 of the safety block 40 acts at the further passage opening 41 which faces the passage opening 17 at which the movable shutter 15 of the regulation stage 20 acts. More preferably, said further passage opening 41 and said passage opening 17 are defined at the opposite ends of the same tubular section 85.

More preferably, in a possible embodiment illustrated in the figures, the upstream zone 72 of the safety block 40 is in direct fluid connection with said gas inlet 31, while the downstream zone 73 of the safety block 40 comprises or corresponds substantially (or at least in part) to the first zone 13 of the regulation stage 20.

Conveniently, therefore, the gas in the upstream region 72 of the regulator 10 is at the pressure Pm which corresponds to the pressure of the gas entering the regulator 10, and therefore to the pressure of the gas upstream of the regulator itself.

Conveniently, as mentioned, when the safety block 40 is activated, the further movable shutter 39 closes the further passage opening 41 so as to block the passage of gas from the upstream zone 72 to the downstream zone 73, thus causing an interruption of the gas between the inlet 31 and the outlet 32.

Preferably, as mentioned, the safety block 40 is of the "normally open/deactivated" type, i.e. it is configured so that—in normal operating conditions of the regulator and therefore when the thrust of the gas at pressure Pu (present in the further second sub-chamber 76) exerted on the first movable dividing element 90, or on the second movable dividing element 92 in the event of damage to said first movable dividing element 90, is lower than the thrust exerted by the thrust means 70 (possibly with the further contribution of atmospheric pressure)—it is in the deactivated condition wherein the further shutter 39 of the safety block 40 is spaced from the further passage opening 41, thus allowing the flow of gas downstream.

Preferably, the containment body 11 comprises two cavities inside, respectively a cavity 86 and said further cavity 87. Ideally, the two cavities 86 and 87 can be substantially equal in terms of shape and dimensions.

More preferably, in a possible embodiment, the two cavities 86 and 87 are separated from each other by a fixed divider 88 (for example defined by a wall) comprising a tubular section 85, and wherein said first passage opening 17 of the first adjustment stage 20 is defined at a first end of the tubular section 85 while said further passage opening 41 of the safety block 40 is defined at the other end (which is opposite to the first) of the same tubular section 85.

In more detail, ideally, at least a part of the second zone 14 and the first control head 50 of the first regulation stage 20 are arranged/defined inside said cavity 86.

More Details

Preferably, the second movable dividing element 92 comprises at least one passthrough hole 110. Ideally, the hole 110 is a calibrated hole. Ideally, the hole 110 may be provided at or near the outer edge of said second movable dividing element 92.

More preferably, the hole 110 of the second movable dividing element 92 faces a support portion 120 which is positioned on a side of said second movable dividing element 92 which is opposite to the side which faces the first movable dividing element and on which the gas at pressure Pu acts directly when the first movable dividing element 90 is damaged (i.e. when there are breakages or punctures of said first element). In particular, the support portion 120 is intended to come into contact with the second movable dividing element 92 at the hole 110 obtained on said second element.

Preferably, the support portion 120 has a surface, with which said second movable dividing element 92 is intended to come into contact, which has a verified roughness and, in particular, has a roughness such as to obtain a gas emission from the hole 110 that is substantially constant and repetitive in various operating conditions and always remaining below a pre-established flow rate threshold, more preferably within a pre-established flow rate range, for example of approximately 1-2.5 SCFH or preferably of approximately 1.5-2 SCFH. In particular, the surface roughness of the support portion 120 which faces the hole 110 substantially hinders, but without blocking, the gas outlet section of the hole itself, thus controlling and limiting the gas flow rate which exits from the hole. For example, in a possible embodiment, the surface roughness of the support portion 120 which faces the hole 110 can be approximately VDI39-VDI45 (i.e. between Ra9 and Ra18) and, more preferably, approximately VDI42-VDI45 (i.e. between Ra12.5 and Ra18). For example, in a possible embodiment, the hole can have a passage section of approximately 0.3-1.5 mm, more preferably approximately 0.6-1 mm.

Conveniently, the support portion 120 is located inside the further first sub-chamber 75 and, therefore, the hole 110, preferably calibrated, defines a fluid connection passage between the further second sub-chamber 76 (wherein there is gas at pressure Pu) and the further first sub-chamber 75 which is provided with a discharge outlet 122 towards the environment wherein the regulator 10 is intended to be installed. Therefore, when the first movable dividing element 90 is damaged (i.e. when there are breakages or punctures of said first element), the outgoing gas of the regulator 10 (i.e. the gas at pressure Pu), in addition to pushing directly on the second movable dividing element 92, passes through the hole 110 and thus enters the further first sub-chamber 75 and from here then through the discharge outlet 122 exits the regulator 10 inside the environment wherein the regulator itself is intended to be installed.

Preferably, the hole 110 of the second movable dividing element 92 faces a support portion 120 having a controlled surface roughness to prevent the hole from becoming blocked and also to reduce the emission of gas through the hole itself. Advantageously, the verified roughness of the support portion 120, which cooperates with the second movable dividing element 92, prevents the hole 110 of said second dividing element from becoming blocked (this would in fact undesirably lead to a zeroing of the gas emission through the hole 110 and towards the outside of the regulator 10, thus preventing the user from perceiving the smell of gas and realizing the anomaly) and also prevents an excessive gas emission from the hole 110 of said second dividing element (this would in fact undesirably lead to an increase in the gas emission through the hole 110 and towards the outside of the regulator 10, with the risk of exceeding the value provided by the regulations for installations in closed environments, for example 2.5 SCFH).

Preferably, in a possible embodiment, the support portion 120 with verified roughness can be obtained/defined directly on the inside of the shell/lid 99 of the containment body 11 which delimits or closes the further cavity 87.

Preferably, in a possible embodiment, the support portion 120 with verified roughness can be obtained/defined on a further dedicated component 124, for example an annular element made of plastic, to be mounted internally on the shell/lid 99 of the containment body 11 which delimits or closes the further cavity 87. Advantageously, this would allow the roughness of the support portion 120 to be controlled and defined in a more precise and designated manner.

Conveniently, the first dividing element 51 and/or the second dividing element 22, may comprise one or more elements of an appropriate shape (and therefore is/are installed and act(s) in a correspondingly shaped seat provided in the regulator), and may be made of rigid and/or elastic material, and in particular may be wholly or partly of the membrane type, possibly with at least one elastically deformable zone. For example, the first dividing element 51 and/or the second dividing element 22 may comprise a support of rigid material (on which the springs act) and a corresponding membrane of elastically deformable material.

Advantageously, the further housing cavity 87 of said safety block 40 is substantially specular and symmetrical, with respect to the divider 88, to the housing cavity 86 of the adjustment stage 20.

Conveniently, in a traditional manner, inside the containment body 11, at the contact zones and at the mechanical couplings between the various components, both movable and fixed, suitable gaskets are mounted, for example of the O-ring type, to thus guarantee gas tightness between the various zones and sub-chambers and thus avoid gas leaks.

Advantages

The solution according to the invention is particularly advantageous as it allows the desired objectives to be achieved and in particular:

the second membrane is a further membrane that acts as a safety membrane in the event of failure/breakage of the first membrane of the safety block, thus ensuring the functionality of the safety block, and at the same time, when the first membrane is intact, does not alter the operation of the latter, the second membrane allows for a calibrated leak in the event of failure/breakage of the first membrane of the safety block, thus avoiding having to install and prepare—particularly in the case of installations in closed environments or near an ignition source—a conveying system or further specific external devices (for example an external gas flow limitation device), ensures the interruption of the gas flow towards the regulator outlet, and therefore guarantees the operational functionality of the safety block, even in the event of failure/breakage of the first membrane of the safety block itself, allows to reduce the gas emissions into the atmosphere in the event of failure/breakage of the first membrane of the safety block; in particular, it allows to reduce the gas emissions into the atmosphere below the values provided by the regulations for installations in closed environments, for example they are below the value of 2.5 SCFH provided by the American and Canadian regulations for installations in closed environments, allows the user to perceive the smell of gas and therefore an anomaly in the safety block or regulator, but this without putting safety at risk and without interrupting the gas supply downstream, in the event of downstream overpressure (or risk of such overpressure) resulting from an anomaly or failure of the first and/or second regulation stage, it allows the gas supply downstream of the regulator to be completely interrupted, without increasing the overall dimensions and/or without introducing substantial changes to the installation architecture.

The present invention has been illustrated and described in a preferred embodiment, but it is understood that executive variations may be made to it in practice, without however departing from the scope of protection of the present patent for industrial invention.

What is claimed is:

1. Regulator for a gas control apparatus in a gas transport and/or distribution network, comprising a containment body with a gas inlet and a gas outlet, and wherein, inside the containment body, the regulator comprises:

at least one regulation stage configured to cause a pressure reduction of the gas which, passing through the regulator, goes from the inlet to the outlet, wherein said at least one regulation stage comprises a first regulation stage comprising:

a first passage opening between a first zone and a second zone which is downstream of said first zone, a first shutter that is movable for obstructing the first passage opening, a first control head comprising a first group that is movable for the controlled movement of the first shutter, and wherein said regulator further comprises a safety block comprising:

a further passage opening between an upstream zone and a downstream zone, a further shutter for the complete closure of said further passage opening, a further control head comprising a further group for the controlled movement of the further shutter, and wherein the further group comprises:

a first movable dividing element with a first side on which directly acts the gas at pressure that corresponds to the gas pressure exiting the regulator or downstream of the regulator itself, a second movable dividing element positioned on or facing a second side of the first dividing element that is opposite to said first side of said first movable dividing element on which acts gas at pressure and wherein:

the first movable dividing element is made entirely or mostly of elastically deformable material, the second movable dividing element is made entirely or mostly of elastically deformable material.

2. The regulator according to claim 1, wherein the safety block is configured so that:

when the first movable dividing element is intact and/or free of breaks or punctures, the second movable dividing element is associated with said first movable dividing element so as to move integrally with the first movable dividing element, thus not altering the operation of the first movable dividing element, when the first movable dividing element is damaged and/or has breaks or punctures, the second movable dividing element moves independently of the first movable dividing element, thus acting as a safety movable dividing element in the event of failure or breakage of the first movable dividing element.

3. The regulator according to claim 1, wherein said safety block is positioned upstream of said at least one regulation stage.

4. The regulator according to claim 1, wherein said safety block is configured to:

operate normally open, cause, when activated, the closure of said further passage opening, be controlled based on gas pressure, corresponding to the gas pressure exiting the regulator or downstream of the regulator itself.

5. The regulator according to claim 1, wherein said safety block is configured so that the gas at pressure, which acts directly on the first movable dividing element or on the second movable dividing element in case of damage to the first movable dividing element, is drawn from a zone inside the containment body of the regulator.

6. The regulator according to claim 1, wherein the first movable dividing element is constituted by a first membrane and wherein the second movable dividing element is constituted by a second membrane.

7. The regulator according to claim 1, wherein:

the first control head comprises a chamber wherein a first dividing element is housed which is movable and which divides the chamber into a first sub-chamber and a second sub-chamber, the further control head comprises a chamber wherein the first movable dividing element and the second movable dividing element are housed, thereby dividing the chamber into a further first sub-chamber and a further second sub-chamber, said further second sub-chamber is fluidically connected to an outlet zone of the regulator and/or to an outlet duct of said regulator, thus receiving the gas at pressure, thrust means are housed in said further first sub-chamber.

8. The regulator according to claim 7, wherein the further group comprises a structure that is movable between:

a first position corresponding to a condition of deactivation of the safety block wherein the further shutter is spaced from the further passage opening, a second position corresponding to a condition of activation of the safety block wherein the further shutter completely closes the further passage opening and wherein the movement of the structure from the first position to the second position is controlled:

when the first movable dividing element is intact, by the force exerted by the gas at pressure on said first movable dividing element in contrast to the action exerted by the thrust means, when the first movable dividing element is not intact, by the force exerted by the gas at pressure on said second movable dividing element in contrast to the action exerted by the thrust means.

9. The regulator according to claim 8, wherein the safety block comprises a gasket for sealing the gas at pressure towards the further first sub-chamber, said gasket being positioned on said structure so as to receive the gas only in the event of breakage or puncture of the first movable dividing element.

10. The regulator according to claim 1, wherein:

the safety block is normally open and it becomes activated when the thrust of the gas at pressure on the first or second movable dividing element exceeds an activation pressure value and, when activated it brings the further shutter from an open position wherein the further shutter is spaced with respect to the further passage opening to a closed position wherein the further shutter completely closes the further passage opening, thus preventing the passage of the gas through said further passage opening as to prevent the gas entering the regulator from the inlet from reaching the outlet of the regulator, the at least one regulation stage is configured to cause a reduction of the pressure of the gas between the first zone to the second zone, the upstream zone of the safety block is in direct fluidic connection with said gas inlet, the downstream zone of the safety block comprises or corresponds at least partially to the first zone.

11. The regulator according to claim 1, wherein:

the further group comprises a structure that is movable, the first movable dividing element is made of elastically deformable material, has a substantially annular disc shape, is centrally constrained to a fixed component of the regulator the second movable dividing element is made of elastically deformable material, has a substantially annular shape, and externally, is integral with the first movable dividing element, while internally, the second movable element is constrained to the structure.

12. The regulator according to claim 1, wherein the safety block is configured so that the first movable dividing element acts by resting on or coming into contact with a structure on which the second movable dividing element is fixed.

13. The regulator according to claim 1, wherein:

the further group comprises a structure that is movable, the first movable dividing element is made of elastically deformable material, has a substantially annular disc shape, is centrally constrained to a fixed component of the regulator, and includes an annular sector that is moved by the pressure of the gas at pressure and acts on the structure, the second movable dividing element is made of elastically deformable material, has a substantially annular shape, and is externally integral with the first movable dividing element, while internally it is constrained to the structure.

14. The regulator according to claim 1, further comprising at least one channel to convey to the second movable dividing element the gas at pressure that passes through the first movable dividing element from side to side.

15. The regulator according to claim 1, wherein the second movable dividing element is configured so that, when the first movable dividing element is damaged, the second movable dividing element triggers the block at substantially a same setpoint value as configured for the first movable dividing element.

16. The regulator according to claim 1, wherein the safety block comprises thrust means, which act on the further group in a direction opposite that of the gas at pressure and further thrust means, which act on the further shutter in such a way as to push the shutter towards the further passage opening.

17. Regulator for a gas control apparatus in a gas transport and/or distribution network, comprising a containment body with a gas inlet and a gas outlet, and wherein, inside the containment body, the regulator comprises:

at least one regulation stage configured to cause a pressure reduction of the gas which, passing through the regulator, goes from the inlet to the outlet, wherein said at least one regulation stage comprises a first regulation stage comprising:

a first passage opening between a first zone and a second zone which is downstream of said first zone, a first shutter that is movable for obstructing the first passage opening, a first control head comprising a first group that is movable for the controlled movement of the first shutter, and wherein said regulator further comprises a safety block comprising:

a further passage opening between an upstream zone and a downstream zone, a further shutter for the complete closure of said further passage opening, a further control head comprising a further group for the controlled movement of the further shutter, and wherein the further group comprises:

a structure that is movable between:

a first position corresponding to a condition of deactivation of the safety block wherein the further shutter is spaced from the further passage opening, a second position corresponding to a condition of activation of the safety block wherein the further shutter completely closes the further passage opening;

a first movable dividing element with a first side on which directly acts the gas at pressure that corresponds to the gas pressure exiting the regulator or downstream of the regulator itself;

a second movable dividing element positioned on or facing a second side of the first dividing element that is opposite to said first side of said first movable dividing element on which acts gas at pressure, wherein the first control head comprises a chamber wherein a first dividing element is housed which is movable and which divides the chamber into a first sub-chamber and a second sub-chamber;

the further control head comprises a chamber wherein the first movable dividing element and the second movable dividing element are housed, thereby dividing the chamber into a further first sub-chamber and a further second sub-chamber, said further second sub-chamber is fluidically connected to an outlet zone of the regulator and/or to an outlet duct of said regulator, thus receiving the gas at pressure, thrust means are housed in said further first sub-chamber, wherein the safety block is configured so that the gas at pressure and thrust means act in opposing directions on the further group, and in that the further group comprises a mechanism, which is actuated/controlled by the movement of the structure, and wherein:

when said structure is in said first position, the structure is configured to lock a further shaft to the structure, when said structure is in said second position, the structure is configured to release from the structure the force of the further shaft towards the closure of the further passage opening.

18. Regulator for a gas control apparatus in a gas transport and/or distribution network, comprising a containment body with a gas inlet and a gas outlet, and wherein, inside the containment body, the regulator comprises:

at least one regulation stage configured to cause a pressure reduction of the gas which, passing through the regulator, goes from the inlet to the outlet, wherein said at least one regulation stage comprises a first regulation stage comprising:

a first passage opening between a first zone and a second zone which is downstream of said first zone, a first shutter that is movable for obstructing the first passage opening, a first control head comprising a first group that is movable for the controlled movement of the first shutter, and wherein said regulator further comprises a safety block comprising:

a further passage opening between an upstream zone and a downstream zone, a further shutter for the complete closure of said further passage opening, a further control head comprising a further group for the controlled movement of the further shutter, and wherein the further group comprises:

a first movable dividing element with a first side on which directly acts the gas at pressure that corresponds to the gas pressure exiting the regulator or downstream of the regulator itself, a second movable dividing element positioned on or facing a second side of the first dividing element that is opposite to said first side of said first movable dividing element on which acts gas at pressure and wherein:

the first control head comprises a chamber wherein a first dividing element is housed which is movable and which divides the chamber into a first sub-chamber and a second sub-chamber, the further control head comprises a chamber wherein the first movable dividing element and the second movable dividing element are housed, thereby dividing the chamber into a further first sub-chamber and a further second sub-chamber, the second movable dividing element comprises at least one passthrough hole to define a communication between the further second sub-chamber and the further first sub-chamber, which is provided with a discharge outlet towards the environment in which the regulator is intended to be installed.

19. The regulator according to claim 18, wherein said at least one passthrough hole of the second movable dividing element faces a support portion with surface roughness to prevent the at least one passthrough hole from clogging and to reduce gas emission through the hole.

* * * * *